March 7, 1944.　　　L. W. WACHTER　　　2,343,597
LOAD SUPPORT
Filed Dec. 5, 1942　　　2 Sheets-Sheet 1

Inventor
Lester W. Wachter
by Parker & Carter
Attorneys.

March 7, 1944.  L. W. WACHTER  2,343,597
LOAD SUPPORT
Filed Dec. 5, 1942  2 Sheets-Sheet 2
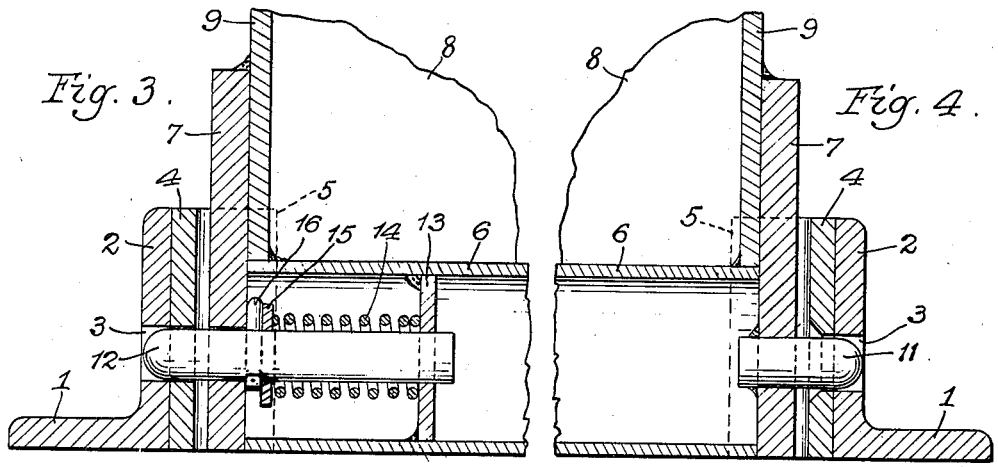
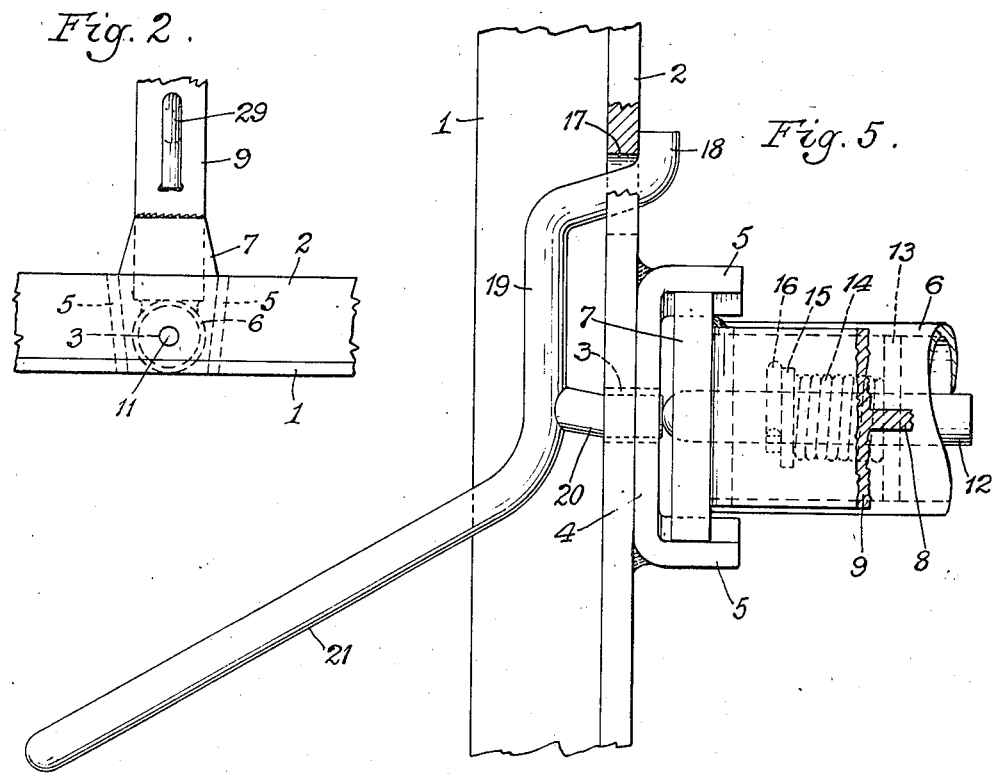
Inventor
Lester W. Wachter
by Parker & Carter
Attorneys.

Patented Mar. 7, 1944

2,343,597

UNITED STATES PATENT OFFICE 2,343,597

LOAD SUPPORT

Lester W. Wachter, Streator, Ill., assignor to Anthony Company, Streator, Ill., a corporation of Illinois Application December 5, 1942, Serial No. 467,934

7 Claims. (Cl. 248—154)

This invention relates to a load carrying and positioning means. It has for one object to provide a removable means for use in connection with a support such as a platform or vehicle and so arranged that it can be removed.

Another object is to provide such a removable positioning means and to arrange it with specially shaped load or article receiving portions, so that particular articles of special shapes may be readily received and held in place. In one form of the invention, the article receiving means might comprise a bomb rack for receiving and supporting aerial bombs which would be generally circular in cross section. In another form it might comprise means for receiving square, rectangular or otherwise shaped articles, and the invention is not limited, therefore, to means for supporting any particular shape of article.

Another object is to provide a removable load carrying and retaining means which can be readily put in place and readily removed.

A still further object is to provide, in combination with a truck having a relatively standard body, means adaptable to and removable therefrom for receiving and retaining particularly shaped pieces, and to provide such means without otherwise altering the essential characteristics of the load carrying truck body. In the past, trucks, trailers, or other vehicles intended to carry bombs or any other specially shaped article have been themselves built for that purpose alone. It is, therefore, one object of the present invention to provide in combination with a vehicle which has a substantially flat load receiving portion removable means for receiving and retaining specially shaped load members without permanently altering the normal characteristics of the body of the vehicle. A truck provided with this invention might be used to carry bombs or any other specially shaped load, and when the rack members are removed, it may be used just as any truck can be used to carry miscellaneous material of a variety of shapes. This invention might be attached to an open body or to a closed body. It might be attached to a dumping body or to a body not arranged for dumping.

Other objects will appear from time to time throughout the specification and claims.

The invention is illustrated more or less diagrammatically in the accompanying drawings, wherein:

Figure 2 is an end elevation of one of the rack members.

Figure 3 is a transverse sectional view on an enlarged scale, showing the left-hand end of Figure 1.

Figure 4 is a view similar to Figure 3, showing the right-hand end of Figure 1.

Figure 5 is a plan view with parts in section and parts broken away, illustrating the means and method of removing the rack member.

Like parts are designated by like characters throughout the specification and drawings.

Figure 6:
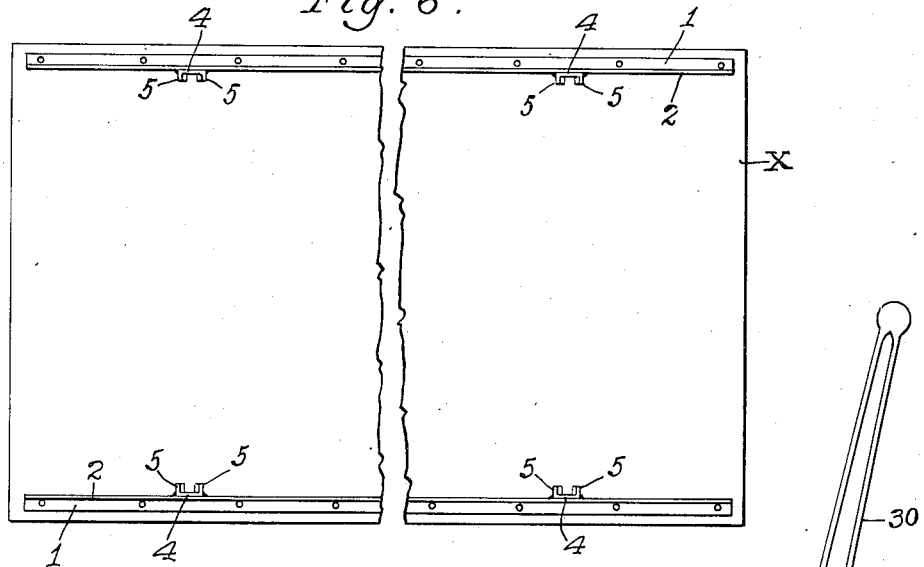
Figure 6 is a fragmentary plan view showing a truck having an open load receiving platform, at the upper surface of which means are provided for receiving the rack members of the present invention.

Upon whatever surface or member the racks are to be received, the rack assembly includes preferably a pair of angle members arranged parallel to each other. Each of the angle members has a lower portion 1 and a standing or vertical portion 2. The lower portion 1 is secured to the truck body or other surface upon which the apparatus is to be mounted. The member 2 is perforated as at 3 to receive the rack members. Perforations are arranged in pairs positioned opposite to each other, and there will be one such pair of perforations for each rack. Opposite each perforation is arranged a socket member. In the particular form here shown the socket member comprises a back 4 and a pair of generally converging side members 5, while the socket members may have any shape. It is generally desirable to give them a shape which is narrowed progressively downwardly, so that when the rack member is positioned in the socket, it tends to be wedged in place.

Each rack member includes a part 6 which as here shown is generally tubular, although it may be of any other desired shape. The tubes or other members 6 are of such size that they extend over the major part of the distance which separates the angle members 1, 2. Secured to each end of each member 6 is a socket entering or plug member 7. This member may be of any desired shape, but as shown particularly in Figure 2, it is tapered to fit tightly into the socket, and particularly to wedge between the converging members 5 of a socket. Extending upwardly from the member 6 is the article receiving portion of the rack. This may be of any desired shape, and that illustrated herewith is shown only for purposes of illustration. As shown herewith, a plurality of web-like portions 8 are secured to the member 6, and they are reinforced at their edges by a reinforcing member 9 which conforms in shape to their upper edges and which is secured also to the plug or socket receiving member 7. It is to be understood that the parts of this invention may be secured together by any desired means, such as welding, riveting, or otherwise. If desired, a cushioning portion 10 may be secured to the reinforcing member 9, so that the articles which are to be carried by the racks may be cushioned, and this cushioning member may be of any desired material, such as leather, rubber, woven fabrics or other similar or analogous material.

Figure 1:
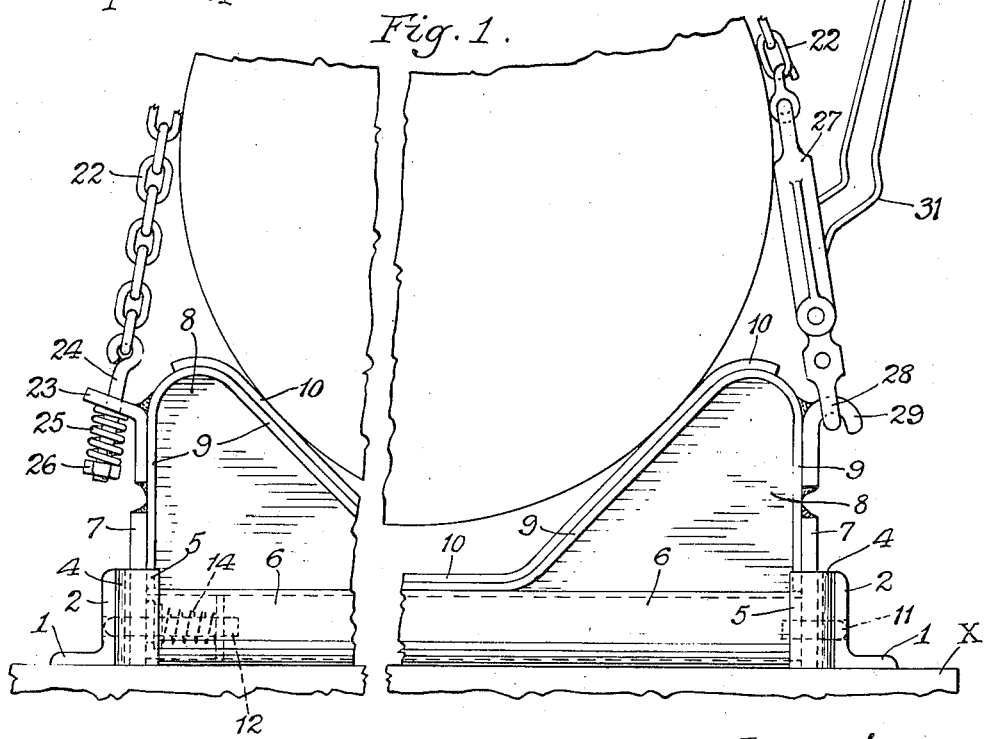
Figure 1 is a transverse sectional view through a truck to which the invention is applied.

Each member 6 is provided at one end, as for example at the right hand end of Figure 1, with a pin 11. This pin is fixed in one of the members 7 and is of such size and shape, as shown particularly in Figures 1 and 4, that when the rack is in place, it penetrates one of the perforations 3. At its opposite end each rack member 6 is provided with a yieldingly held pin 12. As shown, one end of the pin is arranged to fit into and to slide through a partition member 13, fixed within and adjacent one end of the tubular member 6. At its opposite end the pin 12 passes through a corresponding perforation in the member 7, and like the pin 11, it is of suitable size and shape to pass through one of the perforations 3. A compression spring 14 is positioned about the member 12 and bears at one end against the partition 13. At its other end the spring 14 bears against a washer or projection 15, which is mounted about the pin 12, and may be limited as to its movement by a cotter pin 16 or otherwise.

In Figure 5 there is shown means for removing the rack. Adjacent each of the perforations 3 there is formed in the corresponding member 2 a perforation 17, and this is used in removing the rack. As shown in Figure 5, a rack removing tool appears in position of use. This tool includes an end 18 arranged to pass through one of the perforations 17. The tool includes a portion 19 to which is secured a second penetrating member 20, and this penetrating member 20 is so positioned with respect to the point or nose 18 that when the latter has been inserted through one of the holes 17, the member 20 is then properly positioned for insertion in the adjacent hole 3. It will be noticed that the nose or end of the member 18 is laterally bent so that it extends beyond the walls of the perforation 17 and hooks against the portion 2 of the angle member. The tool has a handle portion 21, by means of which it may be rotated to force the penetrating member 20 sufficiently inwardly to depress the pin 12 to free the rack for withdrawal.

Generally, whatever the shape of the article engaging members, some means are provided for holding the article or articles in place on the rack. For that purpose a load binding chain 22 is illustrated herewith, although obviously many other sorts of load engaging and binding means can be used. A chain anchor plate 23 is secured to the reinforcing member 9, as shown at the left-hand end of Figure 1, by means of an eye bolt 24, the chain being secured to the eye of the eye bolt. A spring 25 is positioned about the end of the eye bolt 24 and is adjustably held in place by a nut 26. The spring bears against the angle plate 23 and thus resiliently holds that end of the chain in place. At its opposite end the chain 22 engages the body portion 27 of a load binder. This member 27 is provided with an eye 28 which engages a hook 29 which is itself secured to the reinforcing member 9, as shown particularly in Figure 1. The load binder includes a handle portion 30 provided with a nose 31. When the load is in place and the chain is in the position shown, the load binder handle is moving downwardly and is held in place by the tension of the spring 25. The function of the spring is primarily to provide an even tension on the load binding chain at all times and to serve as a resilient member to allow the load binder 31 to pass over its center of rotation and to lock without the necessity of an adjustment of the chain 22 upon the hook and the load binder.

Although there is shown an operative form of the device, it will be understood that many changes in the form, shape and arrangement of parts might be made without departing from the spirit of this invention, and it is wished that the showing be taken as, in a sense, diagrammatic.

The use and operation of this invention are as follows:

If it be assumed that a load supporting means such as a platform or a vehicle body is supplied with the side members 1, 2 and it is desired to install the rack, the following steps are carried out:

The end of the rack shown in Figure 4 with the fixed pin 11 is lowered into the socket which is formed by the members 4 and 5 so that the pin 11 is in line with the hole 3. The opposite end of the rack will then rest upon the top of the opposite support member 2. The rack is then forced to the right so that the pin 11 enters the perforation 3 in the right hand socket, and the yieldable pin 12 is then forced inwardly against the resistance of the spring 14 so that the plug member 7 will drop into the left-hand socket 4, 5, and when it reaches the full position of Figure 3, the spring 14 forces the latch pin 12 into the perforation 3, and the parts then occupy the position shown in Figures 1, 2 and 3.

When it is desired to remove the rack, the tool shown in Figure 5 is used. It is inserted in the perforation 17 adjacent one of the perforations 3, and it is then rotated about the edge of the perforation 17 by means of the handle 21. This movement forces the point 20 into the perforation 3 against the pin 12 and depresses it to the position shown in Figure 5, in which the spring 14 has been compressed and in which the end of the pin 12 is clear of the perforation 3. With the parts in that position, the left-hand end of the rack may be raised and withdrawn, and then the rack may be moved bodily to the left, and the pin 11 may be withdrawn from its perforation 3. The process is repeated for the removal of each rack. Ordinarily at least two racks will be used together.

I claim:

1. In combination a support and a pair of members positioned thereupon and spaced apart from each other, said members being perforated at a plurality of points, a socket member positioned adjacent each perforation, and a removable rack including a longitudinally extended part, a pin fixed in one end of said part and adapted to enter any one of said perforations, and a movably mounted pin in the other end of said part, said movable pin adapted to enter another of said perforations, and a flexible load retaining means joined at one end to said part, and at its other end provided with means for removably joining said tensioning device to said part.

2. In combination a support and a pair of members positioned thereupon and spaced apart from each other, said members being perforated at a plurality of points, a socket member positioned adjacent each perforation, and a removable rack including a longitudinally extended part, a pin fixed in one end of said part and adapted to enter any one of said perforations, and a movably mounted pin in the other end of said part, and a spring biased to hold said movable pin in the outward position, said movable pin adapted to enter another of said perforations, and a flexible load retaining means joined at one end to said part, and at its other end provided with means for removably joining said tensioning device to said part.

3. In combination a support and a pair of members positioned thereupon and spaced apart from each other, said members being provided with a plurality of perforations, a socket member positioned adjacent each perforation, and a removable rack including a longitudinally extended part, a pin fixed in one end of said part and adapted to enter any one of said perforations, and a movably mounted pin in the other end of said part, said movable pin adapted to enter another of said perforations, and socket engaging members positioned one at each end of said part and adapted to enter any of said sockets, and a flexible load retaining means joined at one end to said part, and at its other end provided with means for removably joining said tensioning device to said part.

4. In combination a support and a pair of perforated members positioned thereupon and spaced apart from each other, a socket member positioned adjacent each perforation and a removable rack including a longitudinally extended part, a pin fixed in one end of said part and adapted to enter one of said perforations, and a movably mounted pin in the other end of said part, and a spring biased to hold said movable pin in the outward position, said movable pin adapted to enter another of said perforations, and socket engaging members positioned one at each end of said part and adapted to enter said sockets.

5. In combination, load supporting means comprising a pair of spaced members, a plurality of perforations formed in each of said members, a socket member positioned about each of said perforations on the inside of said members, a removable rack adapted to be removably supported in any of said sockets, and comprising a main longitudinal member, a pin fixed in one end thereof, a movable pin mounted in the other end thereof, the two pins adapted to fit into any of the said perforations, and load positioning members positioned on said longitudinal member and shaped to receive a load, and a load retaining member secured at one end to said load positioning members, and at its opposite end removably secured to said load positioning members.

6. In combination, load supporting means comprising, a pair of spaced members, perforations formed in said members, a socket member positioned about said perforations in contact with said members, a removable rack adapted to be removably supported in said sockets, and comprising a main longitudinal member, a pin fixed in one end thereof, a movable pin mounted in the other end thereof, a spring biased normally to hold said movable pin outwardly, the two pins adapted to fit into any of the said perforations, socket engaging members positioned on each end of said longitudinal member, each adapted to fit into any one of said sockets, and load positioning members positioned on said longitudinal member and shaped to receive a load, and a load retaining member permanently secured at one end to said load positioning members, and at its opposite end removably secured to said load positioning members.

7. In combination means forming a load carrying support, a pair of spaced apart members carried by said support, each of said members being perforated and being provided on its inner face with an open-sided socket, a removable rack means adapted to be received in said sockets, and comprising a longitudinal portion and a load-receiving portion, there being a fixed pin in said longitudinal portion adapted to enter one of said perforations, and a yieldingly held pin in the opposite end of said portion and adapted to be moved to enter the opposite perforation, and socket engaging means at each end of said longitudinal portions, a spring associated with said yielding pin, and biased to hold said pin in the outward position, and a flexible load-retaining means adapted to engage and retain load upon said load-receiving means, said flexible means resiliently secured to said yielding means at one end, and removably latched thereto at its other end.

LESTER W. WACHTER.